US012731705B2

(12) United States Patent
Takahashi et al.

(10) Patent No.: US 12,731,705 B2
(45) Date of Patent: Sep. 8, 2026

(54) TRANSIENT VOLTAGE PROTECTION DEVICE

(71) Applicant: TDK CORPORATION, Tokyo (JP)

(72) Inventors: Shunsuke Takahashi, Tokyo (JP); Masato Hayatsu, Tokyo (JP); Sota Hiraba, Tokyo (JP); Naoyoshi Yoshida, Tokyo (JP)

(73) Assignee: TDK CORPORATION, Tokyo (JP)

( * ) Notice: Subject to any disclaimer, the term of this patent is extended or adjusted under 35 U.S.C. 154(b) by 458 days.

(21) Appl. No.: 18/455,984

(22) Filed: Aug. 25, 2023

(65) Prior Publication Data

US 2024/0071655 A1 Feb. 29, 2024

(30) Foreign Application Priority Data

Aug. 31, 2022 (JP) ................................ 2022-137739

(51) Int. Cl.
*H01C 1/148* (2006.01)
*H01C 7/12* (2006.01)

(52) U.S. Cl.
CPC ............... *H01C 1/148* (2013.01); *H01C 7/12* (2013.01)

(58) Field of Classification Search
CPC .................................. H01C 1/148; H01C 7/12
See application file for complete search history.

(56) References Cited

U.S. PATENT DOCUMENTS

| | | | | |
|---|---|---|---|---|
| 8,421,582 | B2 * | 4/2013 | Hiehata | H01T 4/12 338/21 |
| 8,760,830 | B2 * | 6/2014 | Ikeda | H02H 3/20 361/56 |
| 9,516,728 | B2 * | 12/2016 | Tsukizawa | H05F 3/04 |
| 9,795,020 | B2 * | 10/2017 | Shibayama | H05K 9/0067 |
| 10,057,970 | B2 * | 8/2018 | Imada | H01T 4/10 |
| 10,193,332 | B2 * | 1/2019 | Adachi | H01T 1/22 |
| 2010/0309595 | A1 | 12/2010 | Adachi et al. | |
| 2024/0071655 | A1 * | 2/2024 | Takahashi | H01C 7/12 |

FOREIGN PATENT DOCUMENTS

| | | |
|---|---|---|
| JP | 2013-168225 A | 8/2013 |
| JP | 2018-185918 A | 11/2018 |
| KR | 2012-0132365 | 12/2012 |
| WO | 2009/098944 A1 | 8/2009 |

OTHER PUBLICATIONS

Jan. 27, 2026 Office Action issued in Japanese Application No. P2022-137739.

* cited by examiner

*Primary Examiner* — Kyung S Lee
(74) *Attorney, Agent, or Firm* — Oliff PLC

(57) ABSTRACT

A transient voltage protection device includes an element body formed with a cavity inside, a pair of internal electrodes, and a discharge assistance portion. The pair of internal electrodes are disposed in the element body and include edges. The edges include parts opposing each other in a first direction in the cavity. The discharge assistance portion is in contact with the parts of the edges. Each of the edges includes a first end exposed on an outer surface of the element body and a second end located opposite the first end and including a corner. The discharge assistance portion includes a pair of edges opposing each other in a second direction intersecting with the first direction and exposed to the cavity. The part included in each of the edges does not include the corner.

7 Claims, 5 Drawing Sheets

TRANSIENT VOLTAGE PROTECTION DEVICE

CROSS-REFERENCE TO RELATED APPLICATIONS

This application is based upon and claims the benefit of priority from Japanese Patent Application No. 2022-137739, filed on Aug. 31, 2022. The entire contents of which are incorporated herein by reference.

BACKGROUND

Field

The present disclosure relates to a transient voltage protection device.

Description of the Related Art

Known transient voltage protection devices include an element body formed with a cavity inside, a pair of external electrodes disposed on the element body, and a pair of internal electrodes and a discharge assistance portion disposed in the element body (see, for example, PCT International Publication No. WO2009/098944). The pair of internal electrodes include edges. Parts of the edges oppose each other in the cavity. The discharge assistance portion is in contact with the parts included in the edges.

SUMMARY

In a configuration in which a length of the discharge assistance portion is greater than a length of the cavity in a direction intersecting with a direction in which the parts included in the edges of the pair of internal electrodes opposing each other, the discharge assistance portion includes a region not exposed to the cavity between the parts of the edges opposing each other. In the present configuration, a discharge may be caused in the region of the discharge assistance portion exposed to the cavity and in a region of the discharge assistance portion not exposed to the cavity. Since the discharge between the regions not exposed to the cavity does not occur through the cavity, a clamp voltage may be affected by an electric resistance value of the element body. In this case, the clamp voltage may vary.

An object of each aspect of the present disclosure is to provide a transient voltage protection device that reduces a variation in the clamp voltage.

A transient voltage protection device according to one aspect of the present disclosure includes an element body formed with a cavity inside, a pair of external electrodes disposed on the element body, a pair of internal electrodes, and a discharge assistance portion. The pair of internal electrodes are disposed in the element body and include edges. The edges include parts opposing each other in a first direction in the cavity. The discharge assistance portion is disposed in the element body and is in contact with the parts included in the edges. Each of the edges includes a first end and a second end. The first end is exposed on an outer surface of the element body and is connected to a corresponding external electrode of the pair of external electrodes. The second end is located opposite the first end and includes a corner. The discharge assistance portion includes a pair of edges opposing each other in a second direction intersecting with the first direction and exposed to the cavity. The part included in each of the edges does not include the corner.

In the one aspect described above, the discharge assistance portion includes the pair of edges opposing each other in the second direction and exposed to the cavity. Therefore, the length of the discharge assistance portion is shorter than the length of the cavity in the second direction. Between the parts included the edges opposing each other, the discharge assistance portion does not include the region not exposed to the cavity. As a result, the one aspect described above tends not to causes the discharge not through the cavity.

The parts included in the edges oppose each other in the cavity and do not include the corner included in the second end. Therefore, the corner is not exposed to the cavity and is not in contact with the discharge assistance portion. As a result, the one aspect described above reliably causes a discharge in the region of the discharge assistance portion exposed to the cavity. Hereinafter, the region of the discharge assistance portion exposed to the cavity may be simply referred to as an "exposed region".

As described above, the one aspect described above reduces the variation in the clamp voltage.

In the one aspect described above, the discharge assistance portion may include another pair of edges opposing each other in the first direction and in contact with corresponding internal electrode of the pair of internal electrodes.

A configuration in which the discharge assistance portion includes another pair of edges further reliably causes the discharge in the exposed region. Therefore, the present configuration further reduces the variation in the clamp voltage.

In the one aspect described above, the discharge assistance portion may be curved in a cross section along a third direction intersecting with the first direction and the second direction.

A configuration in which the discharge assistance portion is curved as described above tends to increase a facing area of the pair of internal electrodes. Therefore, the present configuration can reduce a deterioration of a transient voltage protection characteristics.

In the one aspect described above, the pair of internal electrodes may be curved in the cross section.

A configuration in which the pair of internal electrodes are curved as described above tends to increase the facing area of the pair of internal electrodes. Therefore, the present configuration can reduce the deterioration of the transient voltage protection characteristics.

In the one aspect described above, the pair of internal electrodes may be curved along the discharge assistance portion in the cross section.

A configuration in which the pair of internal electrodes are curved along the discharge assistance portion in the cross section tends to further increase the facing area of the pair of internal electrodes. Therefore, the present configuration can further reduce the deterioration of the transient voltage protection characteristics.

In the one aspect described above, between the parts included in the edges, the discharge assistance portion may include a length in the second direction longer than an interval in the second direction between each of the pair of edges of the discharge assistance portion and a corresponding end of both ends of the cavity.

A configuration in which the discharge assistance portion includes the length in the second direction longer than the interval further reliably causes the discharge in the exposed region. Therefore, the present configuration further reduces the variation in the clamp voltage.

A transient voltage protection device according to another aspect of the present disclosure includes an element body formed with a cavity inside, a pair of external electrodes disposed on the element body, a pair of internal electrodes disposed in the element body to oppose each other in a first direction and exposed to the cavity, and a discharge assistance portion disposed in the element body. The discharge assistance portion is in contact with the pair of internal electrodes. Each of the pair of internal electrodes includes a first end and a second end. The first end is connected to a corresponding external electrode of the pair of external electrodes. The second end is located opposite the first end and includes a corner. The discharge assistance portion includes a pair of edges opposing each other in a second direction intersecting with the first direction. The pair of edges are located inside the cavity when viewed in a third direction intersecting with the first direction and the second direction. The corner is not exposed to the cavity and is not in contact with the discharge assistance portion.

In another aspect described above, the pair of edges of the discharge assistance portion are located inside the cavity when viewed in the third direction. Therefore, a length of the discharge assistance portion is shorter than a length of the cavity in the second direction. Between the pair of internal electrodes opposing each other, the discharge assistance portion does not include a region not exposed to the cavity. As a result, another aspect described above tends not to cause a discharge not through the cavity.

The corner included in the second end is not exposed to the cavity and is not in contact with the discharge assistance portion. Therefore, another aspect described above reliably causes a discharge in a region of the discharge assistance portion exposed to the cavity.

As described above, another aspect described above reduces the variation in the clamp voltage.

The present disclosure will become more fully understood from the detailed description given hereinafter and the accompanying drawings which are given by way of illustration only, and thus are not to be considered as limiting the present disclosure.

Further scope of applicability of the present disclosure will become apparent from the detailed description given hereinafter. However, it should be understood that the detailed description and specific examples, while indicating embodiments of the present disclosure, are given by way of illustration only, since various changes and modifications within the spirit and scope of the present disclosure will become apparent to those skilled in the art from this detailed description.

DETAILED DESCRIPTION

Figure 1:
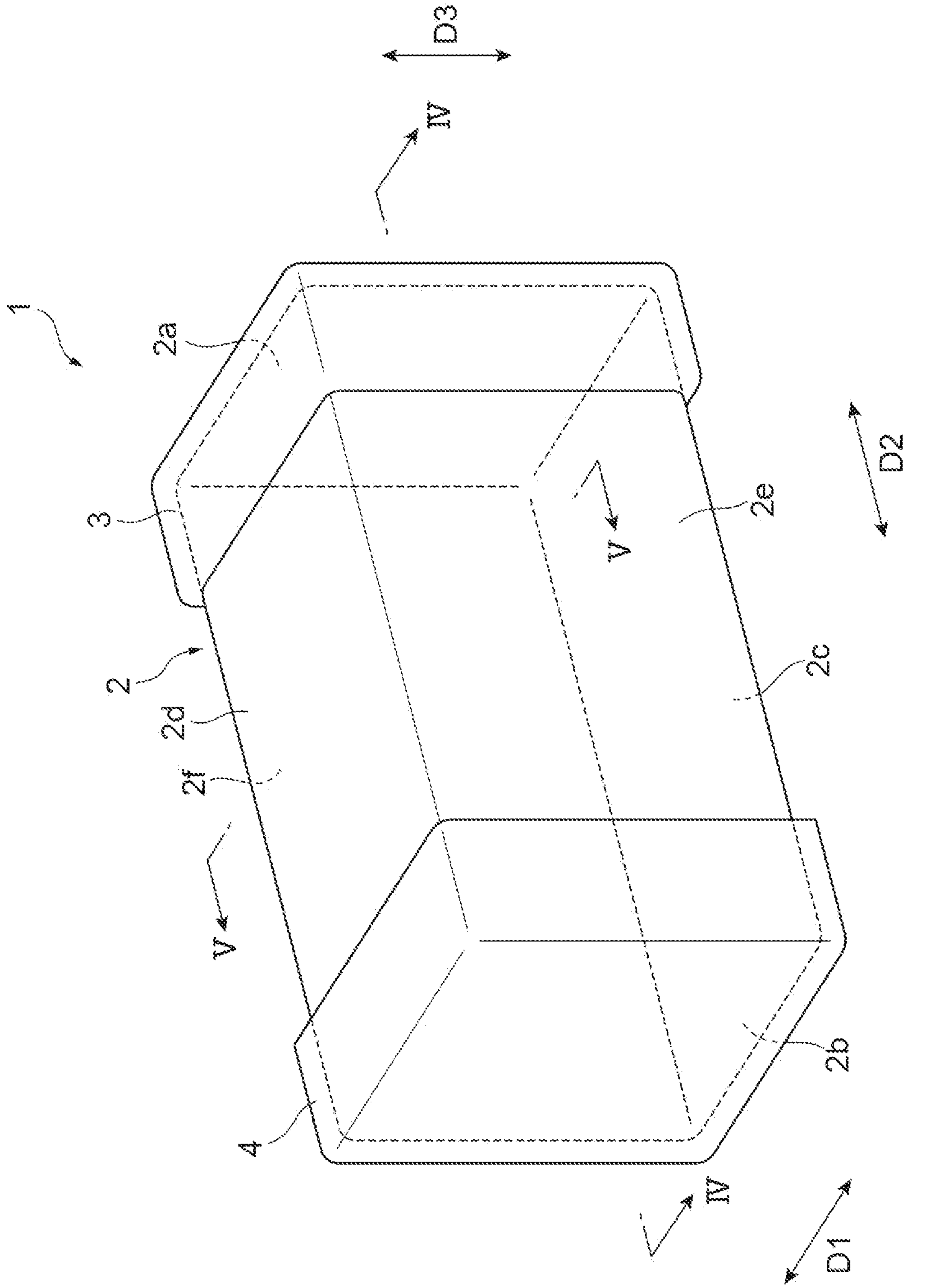
FIG. 1 is a perspective view illustrating a transient voltage protection device according to an embodiment.

Hereinafter, embodiments of the present disclosure will be described in detail with reference to the accompanying drawings. In the following description, the same elements or elements having the same functions are denoted with the same reference numerals and overlapped explanation is omitted.

Figure 2:
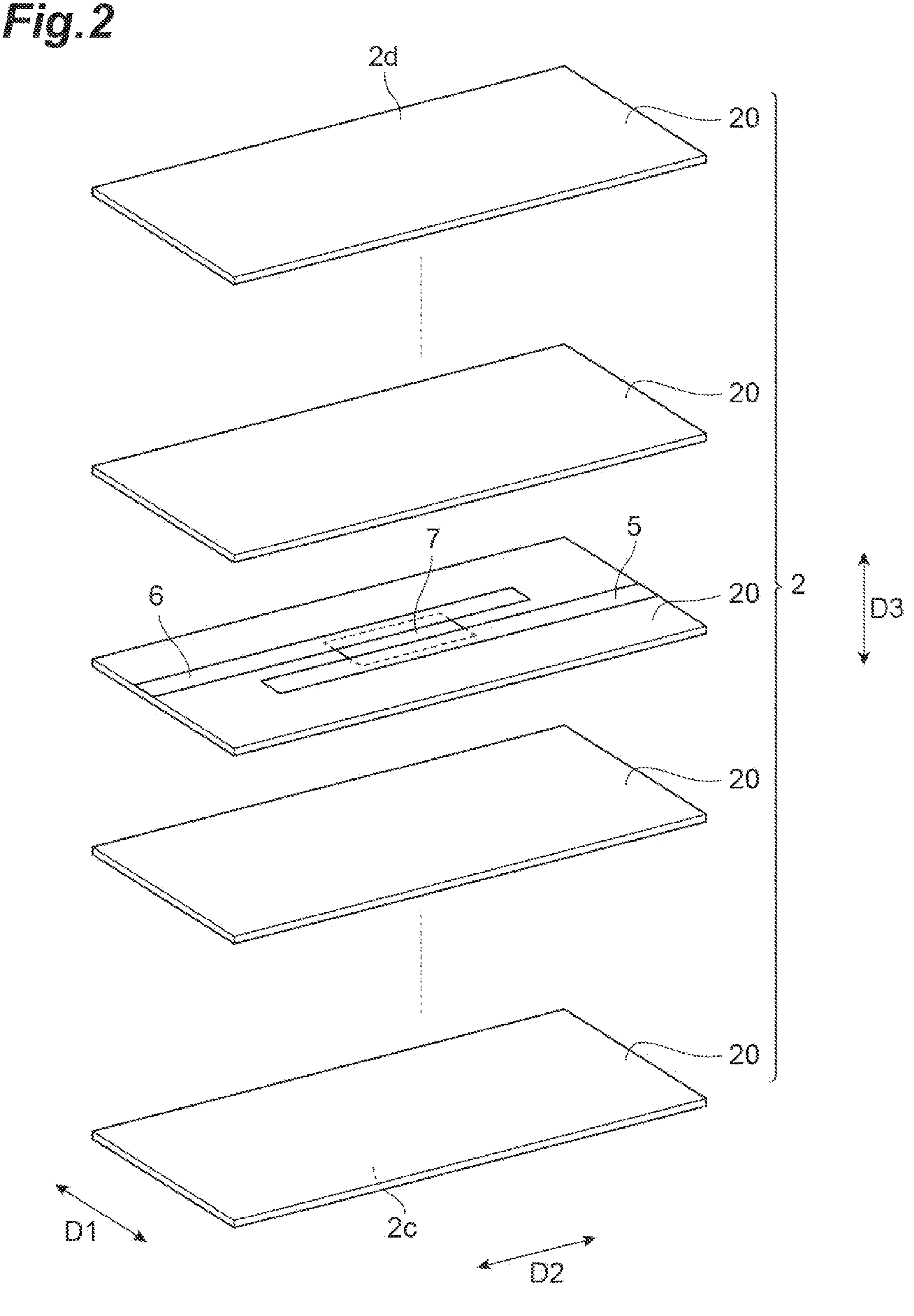
FIG. 2 is an exploded perspective view illustrating a configuration of an element body.
Figure 3:
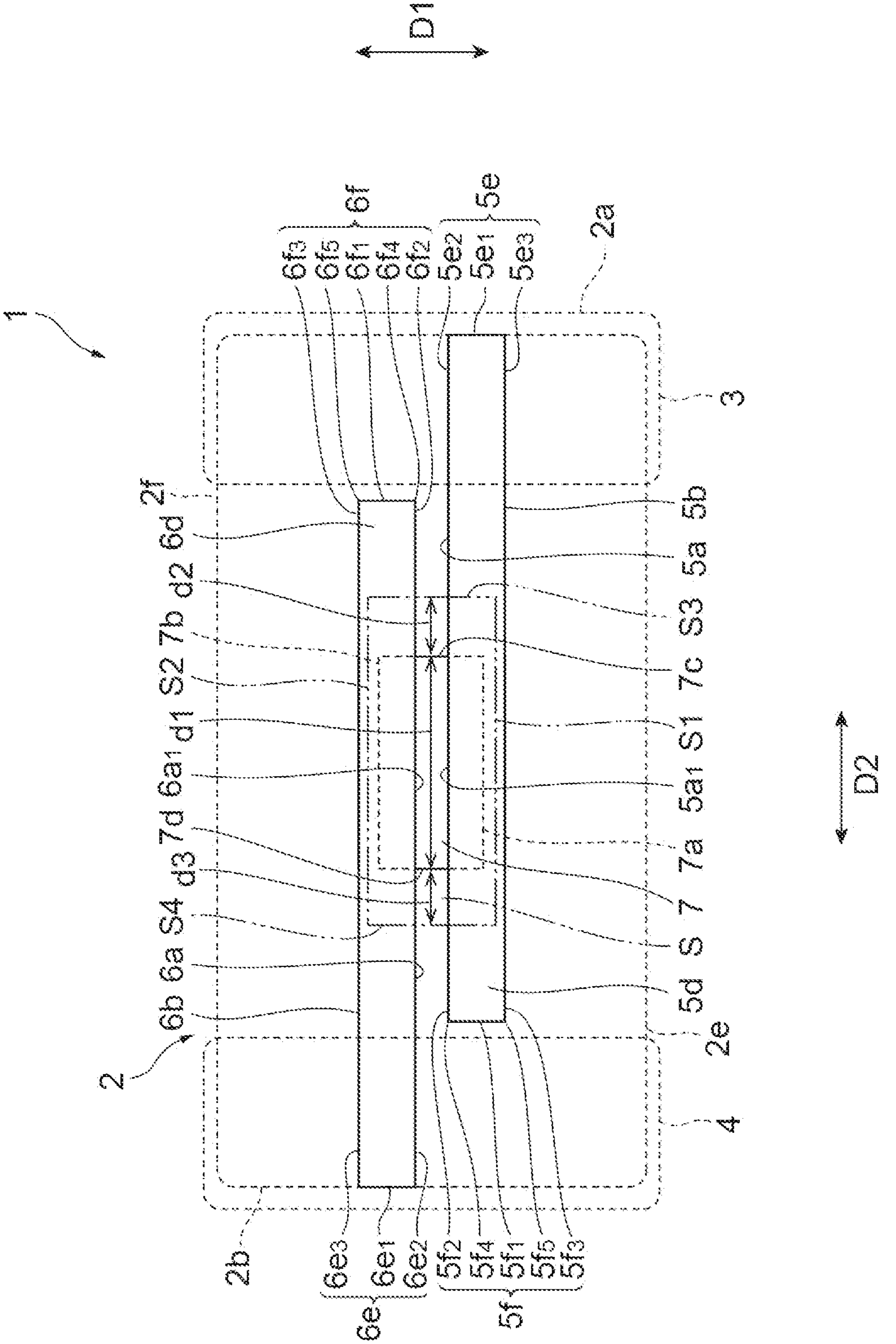
FIG. 3 is a view illustrating a pair of internal electrodes and a discharge assistance portion.
Figure 4:
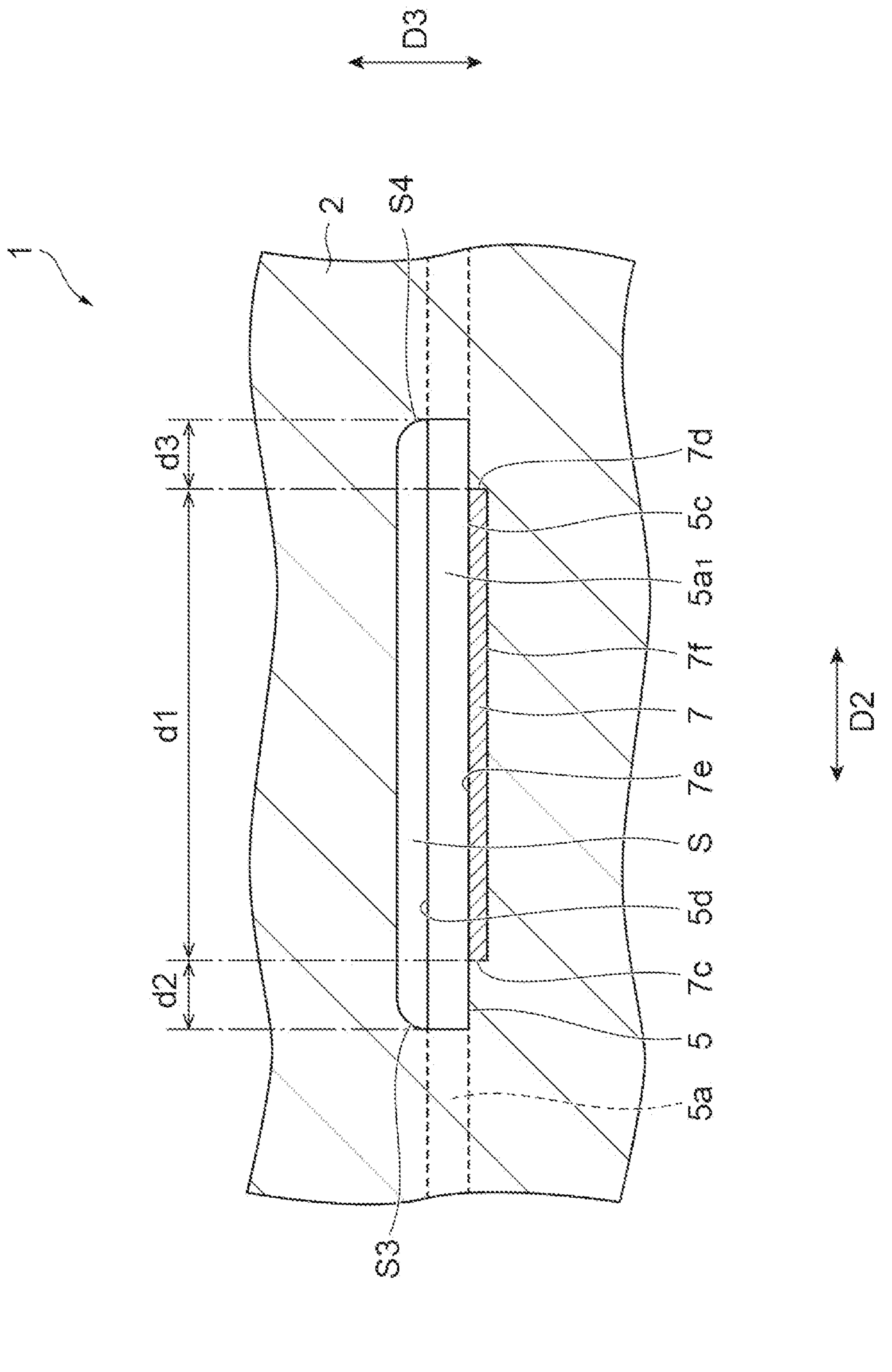
FIG. 4 is a view illustrating a cross-sectional configuration along line IV-IV of FIG. 1.
Figure 5:
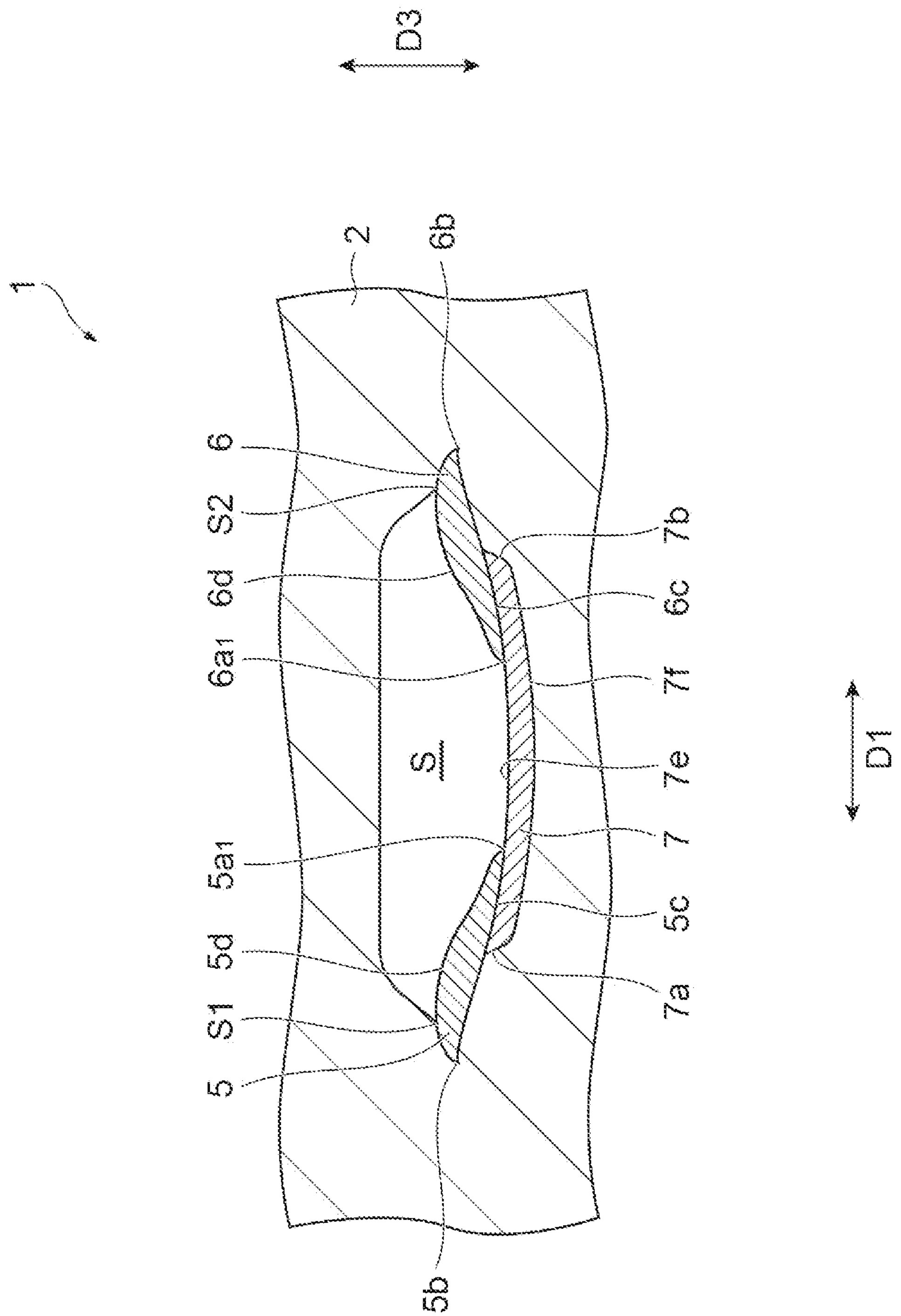
FIG. 5 is a view illustrating a cross-sectional configuration along line V-V in FIG. 1.

A configuration of a transient voltage protection device 1 according to the present embodiment will be described with reference to FIGS. 1 to 5. FIG. 1 is a perspective view illustrating the transient voltage protection device according to the present embodiment. FIG. 2 is an exploded perspective view illustrating a configuration of an element body. FIG. 3 is a view illustrating a pair of internal electrodes and a discharge assistance portion. FIG. 4 is a view illustrating a cross-sectional configuration along line IV-IV of FIG. 1. FIG. 5 is a view illustrating a cross-sectional configuration along line V-V in FIG. 1.

As illustrated in FIGS. 1 and 2, the transient voltage protection device 1 includes an element body 2, a pair of external electrodes 3 and 4, a pair of internal electrodes 5 and 6, and a discharge assistance portion 7. The transient voltage protection device 1 is mounted in an electronic device (not illustrated). The transient voltage protection device 1 protects the electronic device from a transient voltage. The electronic device protected by the transient voltage protection device 1 includes, for example, a circuit board or an electronic component. The transient voltage is caused by, for example, electro-static discharge (ESD).

The element body 2 has a rectangular parallelepiped shape. The rectangular parallelepiped shape includes, for example, a shape of a rectangular parallelepiped in which corner portions and ridgeline portions are chamfered or a shape of a rectangular parallelepiped in which corner portions and ridgeline portions are rounded. The element body 2 includes a pair of end surfaces 2*a* and 2*b* opposing each other, a pair of side surfaces 2*c* and 2*d* opposing each other, and a pair of side surfaces 2*e* and 2*f* opposing each other. In the present embodiment, the pair of side surfaces 2*e* and 2*f* oppose each other in a first direction D1. The pair of end surfaces 2*a* and 2*b* oppose each other in a second direction D2. The pair of side surfaces 2*c* and 2*d* oppose each other in a third direction D3. An outer surface of the element body 2 includes the pair of end surfaces 2*a* and 2*b* and the four side surfaces 2*c*, 2*d*, 2*e*, and 2*f*. The four side surfaces 2*c*, 2*d*, 2*e*, and 2*f* are adjacent to the end surface 2*a* and the end surface 2*b* and extend in the second direction D2 to couple the end surface 2*a* and the end surface 2*b* to each other. One side surface of the four side surfaces 2*c*, 2*d*, 2*e*, and 2*f* is defined as a mounting surface opposing the electronic device on which the transient voltage protection device 1 is mounted.

As illustrated in FIG. 2, the element body 2 is formed through laminating a plurality of insulator layers 20 in the third direction D3. The element body 2 includes the plurality of laminated insulator layers 20. In the element body 2, the insulator layers 20 are integrated with each other to such an extent that each boundary between the insulator layers 20 cannot be visually recognized. Each insulator layer 20 is formed as, for example, a sintered body of a ceramic green sheet. The ceramic green sheet includes an insulator material.

The insulator material is an electrically insulator material. The insulator material includes, for example, a ceramic material. The ceramic material is selected from the group consisting of $Fe_2O_3$, NiO, CuO, ZnO, MgO, $SiO_2$, $TiO_2$, $MnCO_3$, $SrCO_3$, $CaCO_3$, $BaCO_3$, $Al_2O_3$, $ZrO_2$, and $B_2O_3$, for example. The insulator layer 20 may include only a single ceramic material, or may include two or more kinds of ceramic materials. The insulator layer 20 may include glass. The insulator layer 20 may include copper oxide to enable low temperature sintering. The copper oxide includes CuO or $Cu_2O$.

The first direction D1 is a width direction of the element body 2. The second direction D2 is a length direction of the element body 2. The third direction D3 is a height direction of the element body 2. The width of the element body 2 is, for example, 0.3 mm or more and 1.2 mm or less. The length of the element body 2 is, for example, 0.6 mm or more and 2.0 mm or less. The height of the element body 2 is, for example, 0.2 mm or more and 1.2 mm or less. In the present embodiment, the width of the element body 2 is 1.0 mm, the length of the element body 2 is 0.5 mm, and the height of the element body 2 is 0.5 mm.

The external electrodes 3 and 4 are disposed on the element body 2. The external electrodes 3 and 4 are disposed on the element body 2 to oppose each other in the second direction D2. The external electrodes 3 and 4 are disposed at both end portions of the element body 2 in the second direction D2. The external electrodes 3 and 4 are separated from each other in the second direction D2.

The external electrode 3 is disposed on the end surface 2*a*. The external electrode 3 is connected to the internal electrode 5. The external electrode 3 is physically and electrically connected to the internal electrode 5. The external electrode 3 covers the end surface 2*a*. The external electrode 3 also covers a part of each of the four side surfaces 2*c*, 2*d*, 2*e*, and 2*f*. The part of each of the four side surfaces 2*c*, 2*d*, 2*e*, and 2*f* covered with the external electrode 3 is located near the end surface 2*a* in the corresponding side surface of the four side surfaces 2*c*, 2*d*, 2*e*, and 2*f*. The external electrode 3 is disposed on the entire surface of the end surface 2*a* and the end portions of the side surfaces 2*c*, 2*d*, 2*e*, and 2*f* near the end surface 2*a*.

The external electrode 4 is disposed on the end surface 2*b*. The external electrode 4 is connected to the internal electrode 6. The external electrode 4 is physically and electrically coupled to the internal electrode 6. The external electrode 4 covers the end surface 2*b*. The external electrode 4 also covers a part of each of the four side surfaces 2*c*, 2*d*, 2*e*, and 2*f*. The part of each of the four side surfaces 2*c*, 2*d*, 2*e*, and 2*f* covered with the external electrode 4 is located near the end surface 2*b* in the corresponding side surface of the four side surfaces 2*c*, 2*d*, 2*e*, and 2*f*.

The external electrode 4 is disposed on the entire surface of the end surface 2*b* and the end portions of the side surfaces 2*c*, 2*d*, 2*e*, and 2*f* near the end surface 2*b*.

The internal electrode 5 and 6 are disposed in the element body 2 to oppose each other in the first direction D1. Each of the internal electrodes 5 and 6 extends in the second direction D2. The internal electrode 5 is disposed near the side surface 2*e*. The internal electrode 6 is disposed near the side surface 2*f*. The internal electrodes 5 and 6 are disposed at the same height position, that is, at the same laminating position in the third direction D3. As illustrated in FIG. 2, the internal electrodes 5 and 6 are disposed on the same insulator layer 20. The internal electrodes 5 and 6 are disposed substantially in the center in the third direction D3, that is, in the laminating direction of the insulator layers 20.

As illustrated in FIG. 3, the internal electrode 5 includes a pair of edges 5*a* and 5*b* opposing each other and a pair of surfaces 5*c* and 5*d* opposing each other. The pair of edges 5*a* and 5*b* oppose each other in the first direction D1. The pair of surfaces 5*c* and 5*d* oppose each other in the third direction D3. In the present embodiment, the edge 5*a* includes a pair of ends 5*e* and 5*f*. The internal electrode 5 includes the pair of ends 5*e* and 5*f* in addition to the pair of edges 5*a* and 5*b* and the pair of surfaces 5*c* and 5*d*. The edge 5*a* opposes the internal electrode 6. Each of the edges 5*a* and 5*b* is adjacent to the surface 5*c* and the surface 5*d*.

The end 5*e* is exposed on the outer surface of the element body 2. The end 5*e* is exposed on the end surface 2*a*. The end 5*e* is coupled to the external electrode 3. In the present embodiment, the end 5*e* is directly coupled to the external electrode 3. The end 5*e* includes an end coupled to the external electrode 3. The end 5*e* includes an end of the internal electrode 5 and a region extending from the end of the internal electrode 5 to a predetermined length. Therefore, the end 5*e* has the predetermined length in the second direction D2.

In the present embodiment, the end 5*e* includes a surface $5e_1$, a portion $5e_2$, and a portion $5e_3$. The surface $5e_1$ is exposed on the end surface 2*a*. The portion $5e_2$ is located near the internal electrode 6 and extends in the second direction D2. The portion $5e_3$ is located opposite the portion $5e_2$ and extends in the second direction D2. The edge 5*a* includes the portion $5e_2$ of the end 5*e*. The end 5*e* includes a portion included in the edge 5*a* and a portion not included in the edge 5*a*.

The end 5*f* is located opposite the end 5*e* in the second direction D2. The end 5*f* is located inside the element body 2 and is not exposed on the outer surface of the element body 2. The end 5*f* is separated from each of the end surfaces 2*a* and 2*b*. The end 5*f* is buried in the element body 2 and is in contact with the element body 2 only. The end 5*f* is separated from the external electrode 4 and does not overlap the external electrode 4 when viewed in the third direction D3. Similarly to the end 5*e*, the end 5*f* also includes a region extending from an end of the internal electrode 5 to a predetermined length. Therefore, the end 5*f* also has the predetermined length in the second direction D2.

In the present embodiment, the end 5*f* includes a surface $5f_1$, a portion $5f_2$, a portion $5f_3$, and corners $5f_4$ and $5f_5$. The surface $5f_1$ includes an end surface of the internal electrode 5. The portion $5f_2$ is located near the internal electrode 6 and extends in the second direction D2. The portion $5f_3$ is located opposite the portion $5f_2$ and extends in the second direction D2. The corner 5*f*4 is located between the surface $5f_1$ and the portion $5f_2$. The surface $5f_1$ and the portion $5f_2$ are adjacent to the corner $5f_4$. The corner $5f_5$ is located between the surface $5f_1$ and the portion $5f_3$. The surface $5f_1$ and the portion $5f_3$ are adjacent to the corner $5f_5$. The edge 5*a* includes the portion 5*f*2 of the end 5*f*. The end 5*f* includes a portion included in the edge 5*a* and a portion not included in the edge 5*a*. For example, when the end 5*e* includes a first end, the end 5*f* includes a second end.

As illustrated in FIG. 3, the internal electrode 6 includes a pair of edges 6*a* and 6*b* opposing each other and a pair of surfaces 6*c* and 6*d* opposing to each other. The pair of edges 6*a* and 6*b* are opposing to each other in the first direction D1. The pair of surfaces 6*c* and 6*d* oppose each other in the third direction D3. In the present embodiment, the edge 6*a* includes a pair of ends 6*e* and 6*f*. The internal electrode 6 includes the pair of ends 6*e* and 6*f* in addition to the pair of edges 6*a* and 6*b* and the pair of surfaces 6*c* and 6*d*. The edge 6*a* opposes the internal electrode 5. Each of the edges 6*a* and 6*b* is adjacent to the surface 6*c* and the surface 6*d*.

The end 6*e* is exposed on the outer surface of the element body 2. The end 6*e* is exposed on the end surface 2*b*. The end 6*e* is coupled to the external electrode 4. In the present embodiment, the end 6*e* is directly coupled to the external electrode 4. The end 6*e* includes an end coupled to the external electrode 4. The end 6*e* includes an end of the internal electrode 6 and a region extending from the end of the internal electrode 6 to a predetermined length. Therefore, the end 6*e* has the predetermined length in the second direction D2.

In the present embodiment, the end 6*e* includes a surface $6e_1$, a portion $6e_2$, and a portion $6e_3$. The surface $6e_1$ is exposed on the end surface 2*b*. The portion $6e_2$ is located near the internal electrode 5 and extends in the second direction D2. The portion $6e_3$ is located opposite the portion $6e_2$ and extends in the second direction D2. The edge 6*a* includes the portion $6e_2$ of the end 6*e*. The end 6*e* includes a portion included in the edge 6*a* and a portion not included in the edge 6*a*.

The end 6*f* is located opposite the end 6*e* in the second direction D2. The end 6*f* is located inside the element body 2 and is not exposed on the outer surface of the element body 2. The end 6*f* is separated from each of the end surfaces 2*a* and 2*b*. The end 6*f* is buried in the element body 2 and is in contact with the element body 2 only. The end 6*f* is separated from the external electrode 3 and does not overlap the external electrode 3 when viewed in the third direction D3. Similarly to the end 6*e*, the end 6*f* also includes a region extending from an end of the internal electrode 6 to a predetermined length. Therefore, the end 6*f* also has the predetermined length in the second direction D2.

In the present embodiment, the end 6*f* includes a surface $6f_1$, a portion $6f_2$, a portion $6f_3$, and corners $6f_4$ and $6f_5$. The surface $6f_1$ includes an end surface of the internal electrode 6. The portion $6f_2$ is located near the internal electrode 5 and extends in the second direction D2. The portion $6f_3$ is located opposite the portion $6f_2$ and extends in the second direction D2. The corner $6f_4$ is located between the surface $6f_1$ and the portion $6f_2$. The surface $6f_1$ and the portion $6f_2$ are adjacent to the corner $6f_4$. The corner $6f_5$ is located between the surface $6f_1$ and the portion $6f_3$. The surface $6f_1$ and the portion $6f_3$ are adjacent to the corner $6f_5$. The edge 6*a* includes the portion 6*f*2 of the edge 6*f*. The end 6*f* includes a portion included in the edge 6*a* and a portion not included in the edge 6*a*. For example, when the end 6*e* includes a first end, the end 6*f* includes a second end.

The external electrodes 3 and 4 and internal electrodes 5 and 6 include electrically a conductive material. The conductive material includes, for example, Ag, Pd, Au, Pt, Cu, Ni, Al, Mo, or W. The conductive material may include, for example, a Ag/Pd alloy, a Ag/Cu alloy, a Ag/Au alloy, or a Ag/Pt alloy. The external electrodes 3 and 4 and internal electrodes 5 and 6 may include the same electrically conductive material. The external electrodes 3 and 4 and internal electrodes 5 and 6 may include electrically conductive materials different from each other.

The external electrodes 3 and 4 are formed, for example, through sintering an electrically conductive paste applied to the outer surface of the element body 2. The electrically conductive paste for forming the external electrodes 3 and 4 includes the above electrically conductive material. The internal electrodes 5 and 6 are formed, for example, through firing the electrically conductive paste applied on an insulator green sheet together with the insulator green sheet. The electrically conductive paste is applied on the insulator green sheet, for example, through printing. The electrically conductive paste for forming the internal electrodes 5 and 6 also includes the above electrically conductive material.

As illustrated in FIGS. 2 to 5, the discharge assistance portion 7 is disposed in the element body 2. The discharge assistance portion 7 is separated from the outer surface of the element body 2. The discharge assistance portion 7 is not exposed from the element body 2. The discharge assistance portion 7 includes a pair of edges 7*a* and 7*b* opposing each other and a pair of edges 7*c* and 7*d* opposing each other. The pair of edges 7*a* and 7*b* oppose each other in the first direction D1. The pair of edges 7*c* and 7*d* oppose each other in the second direction D2. The discharge assistance portion 7 has a rectangular shape defined by four edges 7*a*, 7*b*, 7*c*, and 7*d* when viewed in the third direction D3. The rectangular shape includes a shape with corners rounded or a shape with corners removed. The discharge assistance portion 7 is separated from the outer surface of the element body 2. The discharge assistance portion 7 is not exposed from the element body 2.

The discharge assistance portion 7 further includes a pair of surfaces 7*e* and 7*f* opposing each other. The pair of surfaces 7*e* and 7*f* oppose each other in the third direction D3. The surface 7*e* is in contact with the internal electrodes 5 and 6. The surface 7*e* is in contact with the surface 5*c* of the internal electrode 5 and the surface 6*c* of the internal electrode 6. The internal electrodes 5 and 6 are disposed on the surface 7*e*. The surface 7*e* includes a region covered with the internal electrodes 5 and 6 and a region exposed from the internal electrodes 5 and 6. The surface 7*f* is in contact with the element body 2. The entire surface 7*f* is covered with the element body 2. The discharge assistance portion 7 is in contact with the internal electrodes 5 and 6 and couples the internal electrodes 5 and 6. The internal electrode 5 and the internal electrode 6 are coupled via the discharge assistance portion 7. A transient voltage suppressor includes the discharge assistance portion 7 and the internal electrodes 5 and 6. The transient voltage suppressor has transient voltage absorption capability.

A width of the discharge assistance portion 7 is, for example, 0.03 mm or more and 0.9 mm or less. A length of the discharge assistance portion 7 is, for example, 0.03 mm or more and 1.6 mm or less. A thickness of discharge assistance portion 7 is, for example, 0.5 μm or more and 10 μm or less. In the present embodiment, the width of the discharge assistance portion 7 is 0.2 mm, the length of the discharge assistance portion 7 is 0.3 mm, and the thickness of the discharge assistance portion 7 is 2 μm. The width of the discharge assistance portion 7 is defined by, for example, the length in the first direction D1. The length of the discharge assistance portion 7 is defined by, for example, the length in the second direction D2. The thickness of the discharge assistance portion 7 is defined by, for example, the length in the third direction D3.

The discharge assistance portion 7 includes an insulator and a metal particle. The insulator is an electrically insulator. The insulator includes, for example, a ceramic material. The ceramic material is selected from the group consisting of $Fe_2O_3$, NiO, CuO, ZnO, MgO, $SiO_2$, $TiO_2$, $MnCO_3$, $SrCO_3$, $CaCO_3$, $BaCO_3$, $Al_2O_3$, $ZrO_2$, and $B_2O_3$, for example. The discharge assistance portion 7 may include only one type of ceramic material selected from this group, or may include two or more types of ceramic materials selected from this group. The metal particle includes, for example, Ag, Pd, Au, Pt, a Ag/Pd alloy, a Ag/Cu alloy, a Ag/Au alloy, or a Ag/Pt alloy. The discharge assistance portion 7 may include a semiconductor particle. The semiconductor particle includes, for example, $RuO_2$. The discharge assistance portion 7 may include a glass.

The discharge assistance portion 7 is formed, for example, through firing slurry applied on the insulator green sheet together with the insulator green sheet. The slurry includes the ceramic material and the metal particle. The slurry is applied on the insulator green sheet, for example, through printing.

As illustrated in FIGS. 3 to 5, the element body 2 is formed with a cavity S inside. The cavity S is separated from the outer surface of the element body 2. Surfaces defining the cavity S include an inner surface of the element body 2, the edge 5*a* of the internal electrode 5, the surface 5*d* of the internal electrode 5, the edge 6*a* of the internal electrode 6, and the surface 6*d* of the internal electrode 6. The surfaces defining the cavity S also include the region of the discharge assistance portion 7 exposed from the internal electrodes 5 and 6. The region of the discharge assistance portion 7 exposed from the internal electrodes 5 and 6 is a region exposed to the cavity S. The discharge assistance portion 7 includes the region exposed to the cavity S.

An end S1 of the cavity S in the first direction D1 is located inside the edge 5*b* of the internal electrode 5 when viewed in the third direction D3. An end S2 of the cavity S in the first direction D1 is located inside the edge 6*b* of the internal electrode 6 when viewed in the third direction D3. An end S3 of the cavity S in the second direction D2 is located inside the end 6*f* of the internal electrode 6 when viewed in the third direction D3. An end S4 of the cavity S in the second direction D2 is located inside the end 5*f* of the internal electrode 5 when viewed in the third direction D3.

The cavity S is formed, for example, through firing an organic lacquer applied on the insulator green sheet together with the insulator green sheet. The cavity S is formed through burning out the organic lacquer. The organic lacquer includes an organic solvent and an organic binder. The organic lacquer is applied on the insulator green sheet, for example, through printing.

As illustrated in FIGS. 3 to 5, the edge 5*a* of the internal electrode and the edge 6*a* of the internal electrode 6 are exposed to the cavity S. In the present embodiment, a part 5$a_1$ of the edge 5*a* and a part 6$a_1$ of the edge 6*a* are exposed to the cavity S. The part 5$a_1$ and the part 6$a_1$ oppose each other in the cavity S. The part 5$a_1$ and the part 6$a_1$ oppose each other in the first direction D1. The part 5$a_1$ and the part 6$a_1$ are in contact with the discharge assistance portion 7. The discharge assistance portion 7 is disposed in the element body 2. The discharge assistance portion 7 is in contact with the part 5$a_1$ and the part 6$a_1$. The part 5$a_1$ and the part 6$a_1$ include a portion in contact with the discharge assistance portion 7 and a portion not in contact with the discharge assistance portion 7.

As described above, since the end S4 of the cavity S is located inside the end 5*f* of the internal electrode 5, the part 5$a_1$ exposed to the cavity S does not include the end 5*f* and the corners 5$f_4$ and 5$f_5$ included in the end 5*f*. Similarly, since the end S3 of the cavity S is located inside the end 6*f* of the internal electrode 6, the part 6$a_1$ exposed to the cavity S does not include the end 6*f* and the corners 6*f*4 and 6$f_5$ included in the end 6*f*. Therefore, the corners 5$f_4$ and 5$f_5$ and the corners 6$f_4$ and 6$f_5$ are not exposed to the cavity S.

As illustrated in FIG. 3, the pair of edges 7*a* and 7*b* of the discharge assistance portion 7 are located inside the cavity S when viewed in the third direction D3. In the present embodiment, when viewed in the third direction D3, the edge 7*a* is located inside the end S1, and the edge 7*b* is located inside the end S2. As described above, when viewed in the third direction D3, the end S1 is located inside the edge 5*b* of the internal electrode 5, and the end S2 is located inside the edge 6*b* of the internal electrode 6. Therefore, when viewed in the third direction D3, the edge 7*a* is located inside the edge 5*b*, and the edge 7*b* is located inside the edge 6*b*. The edge 7*a* is in contact with the internal electrode 5. The edge 7*a* is located inside a peripheral edge of the internal electrode 5. The edge 7*b* is in contact with the internal electrode 6. The edge 7*b* is located inside a peripheral edge of the internal electrode 6. The peripheral edge of the internal electrode 5 is defined by the edges 5*a* and 5*b* and the surfaces 5$e_1$ and 5$f_1$. The peripheral edge of the internal electrode 6 is defined by the edges 6*a* and 6*b* and the surfaces 6$e_1$ and 6$f_1$.

The pair of edges 7*c* and 7*d* of the discharge assistance portion 7 are exposed to the cavity S. In the present embodiment, parts of the pair of edges 7*c* and 7*d* are exposed to the cavity S. The pair of edges 7*c* and 7*d* include a portion exposed to the cavity S and a portion not exposed to the cavity S. The portions of the pair of edges 7*c* and 7*d* which are not exposed to the cavity S are in contact with the internal electrodes 5 and 6.

When viewed in the third direction D3, the pair of edges 7*c* and 7*d* of the discharge assistance portion 7 are also located inside the cavity S. In the present embodiment, when viewed in the third direction D3, the edge 7*c* is located inside the end S3, and the edge 7*d* is located inside the end S4. As described above, when viewed in the third direction D3, the end S3 is located inside the end 6*f* of the internal electrode 6, and the end S4 is located inside the end 5*f* of the internal electrode 5. Therefore, when viewed in the third direction D3, the edge 7*c* is located inside the end 6*f*, and the edge 7*d* is located inside the end 5*f*. The end 5*f* and the end 6*f* are not in contact with the discharge assistance portion 7. The corners 5$f_4$ and 5$f_5$ included in the end 5*f* are not in contact with the discharge assistance portion 7. The corners 6*f*4 and 6$f_5$ included in the edge 6*f* are not in contact with the discharge assistance portion 7.

As illustrated in FIGS. 3 and 4, between the part 5$a_1$ included in the edge 5*a* of the internal electrode 5 and the part 6$a_1$ included in the edge 6*a* of the internal electrode 6, a length d1 of the discharge assistance portion 7 in the second direction D2 is longer than an interval d2 in the second direction D2 between the edge 7*c* of the discharge assistance portion 7 and the end S3 of the cavity S and an interval d3 in the second direction D2 between the edge 7*d* of the discharge assistance portion 7 and the end S4 of the cavity S. That is, between the part 5$a_1$ included in the edge 5*a* of the internal electrode 5 and the part 6$a_1$ included in the edge 6*a* of the internal electrode 6, the discharge assistance portion 7 has the length d1 longer than the interval d2 and the interval d3. As described above, the length of the discharge assistance portion 7 is defined by the length d1 of the discharge assistance portion 7 in the second direction D2. Therefore, the length of the discharge assistance portion 7 is longer than the interval d2 and the interval d3. The interval d2 and the interval d3 may be the same or different.

FIG. 4 is a view of a cross section obtained through cutting the element body 2 along a plane orthogonal to the second direction D2 at a position where the cavity S is formed in a direction from the internal electrode 6 toward the internal electrode 5 in the first direction D1. In the present embodiment, even in a case where the cross section is viewed in a direction from the internal electrode 5 toward the internal electrode 6 in the first direction D1, between the part 5$a_1$ and the part 6$a_1$, a relationship between the length d1, the interval d2, and the interval d3 is the same as the relationship described above.

The length d1 being the length of discharge assistance portion 7 is, for example, 0.03 mm or more and 1.6 mm or less, as described above. The interval d2 is, for example, 0 mm or more and 0.6 mm or less. The interval d3 is, for example, 0 mm or more and 0.6 mm or less. In the present embodiment, the length d1 is 0.3 mm, the interval d2 is 0.1 mm, and the interval d3 is 0.1 mm.

As illustrated in FIG. 5, the discharge assistance portion 7 is curved in a cross section along the third direction D3. The cross section along the third direction D3 illustrated in FIG. 5 is a cross section obtained through cutting the element body 2 along a plane orthogonal to the first direction D1 at a position where the cavity S is formed. The discharge assistance portion 7 is curved in an arc shape in the cross section along the third direction D3. The surface 7*e* and the surface 7*f* are curved in an arc shape. The internal electrodes 5 and 6 are also curved in the cross section along the third direction D3. The internal electrodes 5 and 6 are curved along the discharge assistance portion 7 in the cross section along the third direction D3. In the present embodiment, a part of the surface 5*c* of the internal electrode 5 and a part of the surface 6*c* of the internal electrode 6 are curved along the surface 7*e* of the discharge assistance portion 7.

As described above, in the transient voltage protection device 1, the discharge assistance portion 7 includes the pair of edges 7*c* and 7*d* opposing each other in the second direction D2 and exposed to the cavity S. Therefore, the length of the discharge assistance portion 7 is shorter than the length of the cavity S in the second direction D2. Between the part $5a_1$ included in the edge 5*a* and the part $6a_1$ included in the edge 6*a* opposing each other, the discharge assistance portion 7 does not include a region not exposed to the cavity S. As a result, the transient voltage protection device 1 tends not to generate a discharge through the cavity S.

In the transient voltage protection device 1, the part $5a_1$ of the edge 5*a* and the part $6a_1$ of the edge 6*a* oppose each other in the cavity S, the part $5a_1$ does not include the corners $5f_4$ and $5f_5$ of the edge 5*f*, and the part $6a_1$ does not include the corners $6f_4$ and $6f_5$ of the end 6*f*. Therefore, the corners $5f_4$ and $5f_5$ and the corners $6f_4$ and $6f_5$ are not exposed to the cavity S and are not in contact with the discharge assistance portion 7. As a result, the transient voltage protection device 1 reliably causes a discharge in the region of the discharge assistance portion 7 exposed to the cavity S.

As described above, the transient voltage protection device 1 reduces a variation in a clamp voltage.

In the transient voltage protection device 1, the discharge assistance portion 7 includes the pair of edges 7*a* and 7*b* opposing each other in the first direction D1. The edge 7*a* is in contact with the internal electrode 5. The edge 7*b* is in contact with the internal electrode 6.

The transient voltage protection device 1 further reliably causes the discharge in the region of the discharge assistance portion 7 exposed to the cavity S. Therefore, the transient voltage protection device 1 further reduces the variation in the clamp voltage.

In the transient voltage protection device 1, the discharge assistance portion 7 is curved in the cross section along the third direction D3.

The transient voltage protection device 1 tends to increase a facing area of the pair of internal electrodes 5 and 6. Therefore, the transient voltage protection device 1 can reduce a deterioration of a transient voltage protection characteristics.

In the transient voltage protection device 1, the pair of internal electrodes 5 and 6 are curved in the cross section along the third direction D3.

The transient voltage protection device 1 tends to increase the facing area of the pair of internal electrodes 5 and 6. Therefore, the transient voltage protection device 1 can reduce the deterioration of the transient voltage protection characteristics.

In the transient voltage protection device 1, the pair of internal electrodes 5 and 6 are curved along the discharge assistance portion 7 in the cross section along the third direction D3.

The transient voltage protection device 1 tends to further increase the facing area of the pair of internal electrodes 5 and 6. Therefore, the transient voltage protection device 1 can further reduce the deterioration of the transient voltage protection characteristics.

In the transient voltage protection device 1, between the part $5a_1$ included in the edge 5*a* of the internal electrode 5 and the part $6a_1$ included in the edge 6*a* of the internal electrode 6, the discharge assistance portion 7 includes the length d1 in the second direction D2 longer than the interval d2 in the second direction D2 between the edge 7*c* of the discharge assistance portion 7 and the end S3 of the cavity S and the interval d3 in the second direction D2 between the edge 7*d* of the discharge assistance portion 7 and the end S4 of the cavity S.

The transient voltage protection device 1 further reliably causes the discharge in the region of the discharge assistance portion 7 exposed to the cavity S. Therefore, the transient voltage protection device 1 further reduce the variation in the clamp voltage.

In the transient voltage protection device 1, the pair of edges 7*c* and 7*d* of the discharge assistance portion 7 are located inside the cavity S when viewed in the third direction D3. Therefore, the length of the discharge assistance portion 7 is shorter than the length of the cavity S in the second direction D2. Between the pair of internal electrodes 5 and 6 opposing each other, the discharge assistance portion 7 does not include the region not exposed to the cavity S. As a result, the transient voltage protection device 1 tends not to cause a discharge not through the cavity S.

In the transient voltage protection device 1, the corners $5f_4$ and $5f_5$ and the corners $6f_4$ and $6f_5$ are not exposed to the cavity S and are not in contact with the discharge assistance portion 7. Therefore, the transient voltage protection device 1 reliably causes the discharge in the region of the discharge assistance portion 7 exposed to the cavity S.

As described above, the transient voltage protection device 1 reduces the variation in the clamp voltage.

Although the embodiment of the present disclosure has been described above, the present disclosure is not necessarily limited to the embodiment, and the embodiment can be variously changed without departing from the scope of the disclosure.

The edge 7*a* may not be in contact with the internal electrode 5, and the edge 7*b* may not be in contact with the internal electrode 6. In this case, the edge 7*a* may be located outside the edge 5*b* of the internal electrode 5 in the first direction D1, and the edge 7*b* may be located outside the edge 6*b* of the internal electrode 6 in the first direction D1. The transient voltage protection device 1 in which the edge 7*a* is in contact with the internal electrode 5 and the edge 7*b* is in contact with the internal electrode 6 further reduces the variation in the clamp voltage as described above.

The discharge assistance portion 7 may not be curved in the cross section along the third direction D3. The transient voltage protection device 1 in which the discharge assistance portion 7 is curved in the cross section along the third direction D3 reduce the deterioration of the transient voltage protection characteristics as described above.

The pair of internal electrodes 5 and 6 may not be curved in the cross section along the third direction D3. The transient voltage protection device 1 in which the pair of internal electrodes 5 and 6 are curved in the cross section along the third direction D3 reduce the deterioration of the transient voltage protection characteristics as described above.

The pair of internal electrodes 5 and 6 may not be curved along the discharge assistance portion 7 in the cross section along the third direction D3. The transient voltage protection device 1 in which the pair of the internal electrodes 5 and 6 are curved along the discharge assistance portion 7 in the cross section along the third direction D3 further reduce the deterioration of the transient voltage protection characteristics as described above.

Between the part $5a_1$ included in the edge $5a$ of the internal electrode 5 and the part $6a_1$ included in the edge $6a$ of the internal electrode 6, the discharge assistance portion 7 may not include the length d1 in the second direction D2 longer than the interval d2 in the second direction D2 between the edge $7c$ of the discharge assistance portion 7 and the end S4 of the cavity S and the interval d3 in the second direction D2 between the edge $7d$ of the discharge assistance portion 7 and the end S3 of the cavity S. The transient voltage protection device 1 in which the discharge assistance portion 7 includes the length d1 longer than the interval d2 and the interval d3 further reduces the variations in the clamp voltage as described above.

What is claimed is:

1. A transient voltage protection device comprising:

an element body formed with a cavity inside;

a pair of external electrodes disposed on the element body;

a pair of internal electrodes disposed in the element body and including edges, the edges including parts opposing each other in a first direction in the cavity; and a discharge assistance portion disposed in the element body, the discharge assistance portion being in contact with the parts included in the edges, wherein each of the edges includes:

a first end exposed on an outer surface of the element body and connected to a corresponding external electrode of the pair of external electrodes; and a second end located opposite the first end and including a corner, the discharge assistance portion includes a pair of edges opposing each other in a second direction intersecting with the first direction and exposed to the cavity, none of the parts included in the edges of the internal electrodes includes the corner included in the second end, and when viewed in a third direction intersecting with the first direction and the second direction, the discharge assistance portion is completely within the cavity.

2. The transient voltage protection device according to claim 1, wherein the discharge assistance portion includes another pair of edges opposing each other in the first direction and each in contact with corresponding internal electrode of the pair of internal electrodes.

3. The transient voltage protection device according to claim 1, wherein the discharge assistance portion is curved in a cross section along the third direction intersecting with the first direction and the second direction.

4. The transient voltage protection device according to claim 3, wherein the pair of internal electrodes are curved in the cross section.

5. The transient voltage protection device according to claim 4, wherein the pair of internal electrodes are curved along the discharge assistance portion in the cross section.

6. The transient voltage protection device according to claim 1, wherein, between the parts of the edges of the pair of internal electrodes, the discharge assistance portion includes a length in the second direction longer than an interval in the second direction between each of the pair of edges of the discharge assistance portion and a corresponding end of both ends of the cavity.

7. A transient voltage protection device comprising:

an element body formed with a cavity inside;

a pair of external electrodes disposed on the element body;

a pair of internal electrodes disposed in the element body, the pair of internal electrodes opposing each other in a first direction and being exposed to the cavity; and a discharge assistance portion disposed in the element body, the discharge assistance portion being in contact with the pair of internal electrodes, wherein each of the pair of internal electrodes includes:

a first end connected to a corresponding external electrode of the pair of external electrodes and a second end located opposite the first end and including a corner, the discharge assistance portion includes a pair of edges opposing each other in a second direction intersecting with the first direction, the pair of edges are located inside the cavity when viewed in a third direction intersecting with the first direction and the second direction, the corner is not exposed to the cavity and is not in contact with the discharge assistance portion, and when viewed in the third direction, the discharge assistance portion is completely within the cavity.

* * * * *